UNITED STATES PATENT OFFICE 2,071,372

DYESTUFFS OF THE FLUORINDINE SERIES AND A PROCESS OF PREPARING THEM

Arthur Wolfram and Kurt Bonstedt, Frankfort-on-the-Main, Germany, assignors to General Aniline Works, Inc., of New York, N. Y., a corporation of Delaware No Drawing. Application August 10, 1934, Serial No. 739,326. In Germany August 11, 1933

12 Claims. (Cl. 260—29)

The present invention relates to dyestuffs of the fluorindine series and to a process of preparing them.

The group of N-N'-substituted fluorindines of the following general formula:

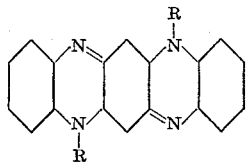

wherein R means a substituent, has been known for a long time. Though this class of bodies comprises intensely colored compounds it could not become of importance in relation to the art of dyeing since the N-N'-substituted fluorindines, hitherto known, are extraordinarily sensitive to alkali and acid.

We have found that this undesired property, in many cases, may be diminished considerably by building up, according to known methods, the N-N'-substituted fluorindines in such a way that they contain groups of a pronounced negative character or polynuclear ring systems or both.

For instance, dyestuffs of improved fastness properties are obtained by oxidizing, according to known methods, azophenins of the following general formula:

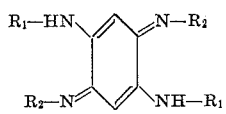

wherein $R_1$ represents an aromatic radical containing a negative substituent of the group consisting of nitro, CO-alkyl, CO-aryl and carboxyl, or containing more than one aromatic nucleus or a quinone nucleus and wherein $R_2$ represents an aromatic hydrocarbon radical, into fluorindines and sulfonating, if desired, the products thus obtained. The constitution of the products obtained cannot be stated with certainty since it is not known at which places in the molecule the oxidizing action occurs.

It has been found advantageous to use as groups having a pronounced negative character: the nitro group, the CO-R-group in which R stands for alkyl or aryl, the carboxylic acid group, the quinone group or the like. The following polynuclear ring systems are of advantage: the ring system of naphthalene, diphenyl, stilbene, pyrene, anthracene or the like.

The dyestuffs which are obtainable by oxidizing, according to known methods, azophenins of the following general formula:

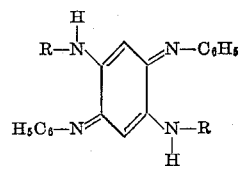

wherein R represents a nitro-substituted benzene radical or a radical of the naphthalene-, anthraquinone- or pyrene series, to form fluorindines and sulfonating, if desired, the products thus obtained have especially improved fastness properties.

The products may be halogenated, if desired.

The sulfonated new compounds shall be useful for dyeing fibers, and the unsulfonated ones are lake dyestuffs.

The following examples serve to illustrate the invention but they are not intended to limit it thereto, the parts being by weight unless otherwise stated.

(1) One part of p-quinonedianil is introduced, while stirring, into a solution of 2.5 parts of p-nitraniline in 25 parts of glacial acetic acid at a temperature of 115° C. to 120° C. After heating for one hour, the red-brown crystals obtained are filtered from the warm solution. The dinitroazophenin thus obtained dissolves in concentrated sulfuric acid to a Bordeaux-red solution.

One part of the dinitroazophenin thus obtained is dissolved in 50 parts of nitrobenzene and 5 parts of pyrolusite are introduced into the boiling solution. After boiling for one hour, the solution has become blue-violet. It is filtered, while hot, from the manganese oxides and the fluorindine precipitates in the form of dark crystals having a metallic luster. In concentrated sulfuric acid it dissolves to a deep blue solution. The dyestuff probably has one of the two constitutions:

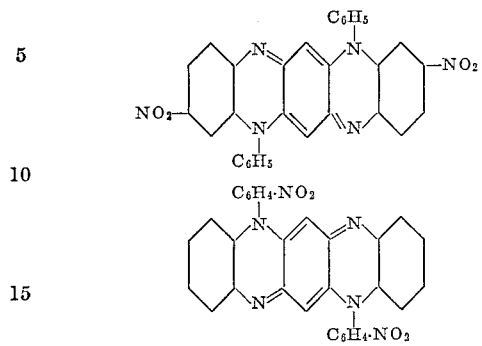

With fuming sulfuric acid containing 20% of sulfuric anhydride the product may be sulfonated easily.

(2) 8 parts of p-quinonedianil are introduced at 110° C. into a suspension of 4.5 parts of β-aminoanthraquinone in 50 parts of glacial acetic acid. After one hour the product thus obtained is filtered with suction and well washed with alcohol. It forms red-brown crystals which dissolve in concentrated sulfuric acid to a violet solution.

One part of the product thus obtained is dissolved in 15 parts of nitrobenzene and into the boiling solution 0.8 part of lead dioxide is introduced. After 30 minutes the solution has become greenish brown. After filtration and cooling, the fluorindine separates from the solution in the form of yellow-brown crystals which dissolve in concentrated sulfuric acid to a green solution. The dyestuff has probably one of the two constitutions:

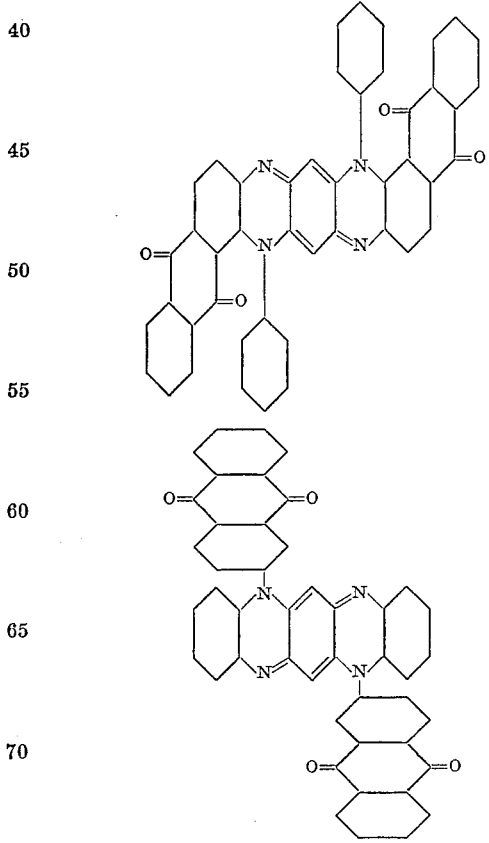

It may be sulfonated as above described.

(3) 1.5 parts of 3-aminopyrene (melting at 117° C.) are suspended in 20 parts of glacial acetic acid and mixed at room temperature with 3 parts of p-quinonedianil and the whole is heated for one hour at 110° C. After cooling to about 70° C., 10 parts of alcohol are added and the reaction product thus obtained is filtered. By exhausting it with boiling alcohol, the diphenyl-p-phenylenediamine formed as by-product in the course of the reaction is extracted. The exhausted product forms small black crystals which dissolve in concentrated sulfuric acid to a violet solution.

One part of the product thus obtained is dissolved in 15 parts of α-chlornaphthalene and the solution is mixed, while hot, with 0.9 part of lead dioxide and boiled for 30 minutes. The solution which thereafter has become blue, is filtered from the lead oxides; on cooling, the fluorindine separates from the solution in the form of small crystals which dissolve in concentrated sulfuric acid to a green solution. The dyestuff probably has one of the two constitutions:

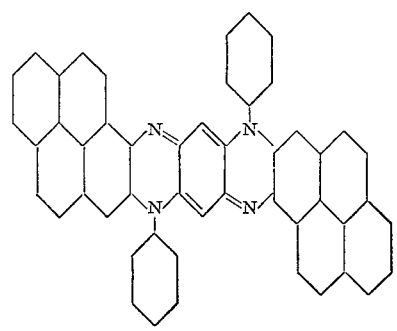

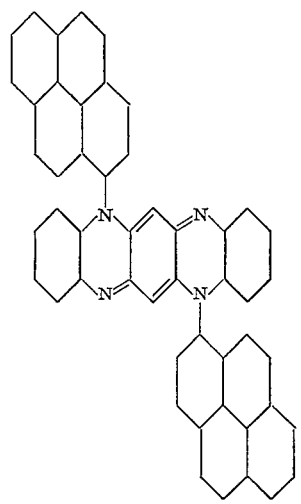

By dissolving the fluorindine in sulfuric acid monohydrate and adding such a quantity of fuming sulfuric acid containing 20% of sulfuric anhydride that the content of $SO_3$ of the solution amounts to about 5%, sulfonation takes place easily. By addition of bromine to such a solution, bromination occurs immediately.

(4) 7 parts of 4-chloro-1-naphthylamine and 16 parts of p-quinonedianil are stirred with 70 parts of glacial acetic acid and the mixture is heated for one hour at 70° C. After filtration, the light brown product is washed with hot glacial acetic acid and dried. It dissolves in concentrated sulfuric acid to a red-violet solution.

One part of this product is dissolved in 30 parts of α-chloronaphthalene and mixed at boiling temperature with one part of lead dioxide. After 30 minutes the solution has become blue. It is filtered from the lead oxides and, on cooling, the fluorindine separates in the form of dark crystals. The dyestuff probably has one of the two constitutions:

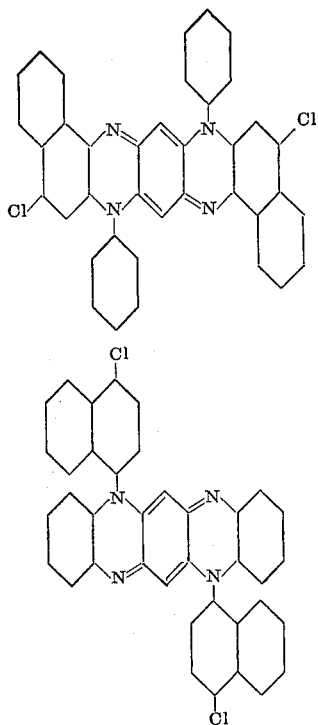

The crystals dissolve in concentrated sulfuric acid to a greenish blue solution. The product may be sulfonated as described above.

(5) 150 parts of m-nitraniline in 1000 parts of glacial acetic acid are stirred at 90° C. to 100° C. with 60 parts of p-quinonedianil for one hour. After cooling to 30° C., the dinitro-azophenin thus obtained is filtered with suction, washed with alcohol and dried. It forms red-brown crystals which dissolve in sulfuric acid to a violet-red solution.

10 parts of m-dinitro-azophenin thus obtainable are heated to boiling in 400 parts of nitrobenzene; 10 parts of lead dioxide are then introduced and after 15 minutes the lead oxides are eliminated by filtering. After cooling, the dinitrofluorindine crystallizes from the nitrobenzene in the form of small crystals having a greenish surface luster. The dyestuff probably has one of the two constitutions:

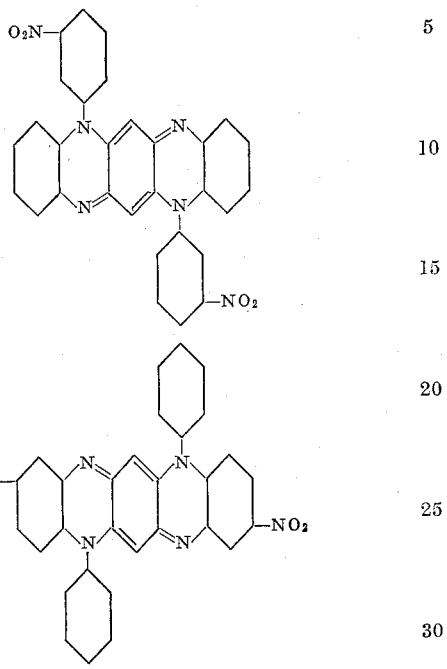

The product dissolves in nitrobenzene to a bluish-red solution and in sulfuric acid to a blue solution. With fuming sulfuric acid containing 20% of sulfuric anhydride sulfonation takes place easily at 70° C. to 80° C.

(6) A melt of 10 parts of para-aminodiphenyl is stirred at 90° C. with 1 part of the hydrochloride of para-aminodiphenyl and 1 part of para-nitrosophenol is added in small portions so that the temperature remains as constant as possible. After one hour, the whole is allowed to cool to about 70° C. and 10 parts of alcohol are then added. The precipitated crystals are filtered with suction and thoroughly washed with water in order to eliminate the hydrochloride. The reaction product thus obtained forms red-brown crystals which dissolve in concentrated sulfuric acid to a blue solution.

1 part of the product thus obtained is dissolved in 30 parts of nitrobenzene and the solution is heated at boiling temperature for half-an-hour with 0.7 part of lead dioxide. The blue-violet solution is filtered, while hot, on cooling, the fluorindine separates in the form of dark crystals which dissolve in concentrated sulfuric acid to a blue solution. By causing fuming sulfuric acid of 20% strength to act upon the product, the latter may easily be sulfonated.

(7) 3 parts of para-quinonedianil are introduced at 110° C. into a solution of 1.5 parts of para-aminobenzoic acid in 20 parts of glacial acetic acid. After 1½ hours the whole is allowed to cool to 70° C. and 10 parts of alcohol are added thereto. After filtering, the reaction product remains in the form of light-brown crystals which dissolve in concentrated sulfuric acid to a violet solution.

1 part of the product thus obtained is dissolved in 15 parts of nitrobenzene and 1 part of lead dioxide is introduced into the boiling solution. After boiling for 1½ hours, the solution shows a red color. It is filtered, while hot, from the lead oxides and, on cooling, the fluorindine separates from the solution in the form of black crystals. In concentrated sulfuric acid it dissolves to a dark blue solution.

(8) 5.4 parts of meta-amino-acetophenone and 16 parts of para-quinonedianil are stirred with 70 parts of glacial acetic acid and then heated for 1 hour at 70° C. After filtering, the light-brown product is washed with glacial acetic acid. It dissolves in concentrated sulfuric acid to a red-violet solution.

1 part of this reaction product is dissolved in 30 parts of alpha-chloronaphthalene and 1 part of lead dioxide is added thereto at boiling temperature. After 30 minutes, the solution has assumed a red-violet color. After filtering from the lead oxides, the fluorindine separates on cooling, in a crystalline form. It dissolves in concentrated sulfuric acid to a green solution.

(9) 41 parts of bis-(diphenyl)-para-quinone-diimine, obtainable by condensation of para-aminodiphenyl with hydroquinone and subsequent oxidation with PbO2, are vigorously stirred for 4 hours at 80° C. with 150 parts of aniline and 5 parts of hydrochloride of aniline. After cooling, the reaction product consisting of azophenine and N-N'-di-diphenyl-para-phenylenediamine is filtered with suction washed and dried.

10 parts of this mixture are boiled for 30 minutes in 300 parts of chloronaphthalene with 25 parts of lead dioxide. Red crystals of bis-diphenyl-para-quinone-diimine and greenish brilliant crystals of fluorindine separate from the filtrate. They are filtered, washed with alcohol and dried. Both these bodies which are very similar to each other in solubility are separated by taking advantage of the fact that, on heating the mixture with phenylhydrazine, the bis-di-phenyl-para-quinonediimine is reduced to N-N'-diphenyl-para-phenylene-diamine whereas the fluorindine remains unchanged. By boiling with acetic acid anhydride, N-N'-di-diphenyl-para-phenylene-diamine may be dissolved easily. On filtering, the fluorindine which has perhaps the following constitution:

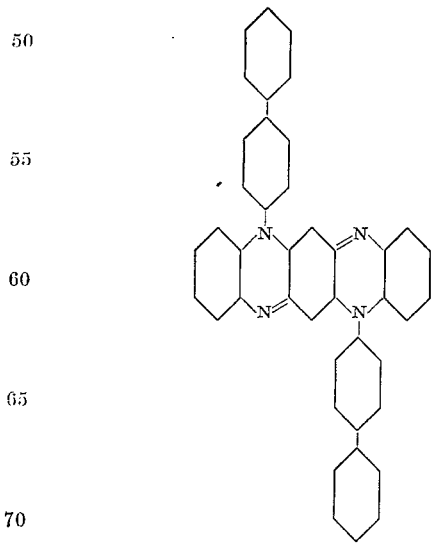

remains in the form of greenish-glittering crystals which, on trituration, yield a blue powder. The product dissolves in concentrated sulfuric acid to a blue solution. It may be sulfonated in the cold by means of fuming sulfuric acid of 10% strength.

(10) 108 parts of bis-alpha-naphthyl-para-quinone-diimine, obtainable by oxidizing di-alpha-naphthyl-para-phenylene-diamine with lead dioxide, are stirred for 1 hour at 70° C. with 42 parts of aminopyrene and 1 part of glacial acetic acid in 500 parts of chlorobenzene. After cooling, the whole is filtered, the solid matter is washed with alcohol, and dried.

100 parts of the reaction product consisting of azo phenine and N-N'-di-alpha-naphthyl-para-phenylenediamine are boiled in 1500 parts of alpha-chloronaphthalene with 200 parts of PbO2 until the whole assumes a blue color. Whereas the bis-alpha-naphthyl-para-quinone-diimine formed remains in solution, the fluorindine separates in a crystalline form; it is filtered with suction together with the lead oxides, washed with alcohol and dried. By treating with dilute nitric acid and H2O2 the lead oxides are eliminated. The fluorindine thus isolated which may have the following constitution:

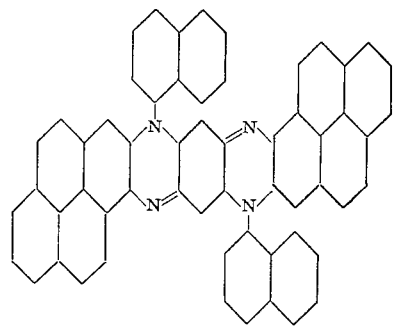

may be recrystallized from alpha-chloronaphthalene. It dissolves in sulfuric acid to a green solution, on warming the color first turns blue and then violet. The product dissolves in trichlorobenzene to a blue solution with red fluorescence.

(11) 108 parts of bis-beta-naphthyl-para-quinone-diimine, obtainable by oxidation of di-beta-naphthyl-para-phenylene diamine with PbO2, are stirred with 40 parts of aminodiphenylene-dioxide and 1 part of hydrochloride of aminodiphenylene-dioxide in 500 parts of alcohol first for 2 hours at room temperature and then for 6 hours at the boiling temperature of the alcohol. After cooling, the reaction product is completely filtered and boiled out with 2000 parts of pyridine. The azophenine which remains undissolved is filtered with suction washed with alcohol and dried. Light-brown small crystals, melting at 288° C., are obtained; they dissolve in sulfuric acid to a pure green solution.

72 parts of azophenine are boiled for 15 minutes with 60 parts of PbO2 in 750 parts of alpha-chloro-naphthalene. After complete cooling the whole is filtered, the solid residue is washed with alcohol, dried and freed from lead oxides by means of dilute nitric acid and H2O2. The thus obtained fluorindine which may have the following constitution:

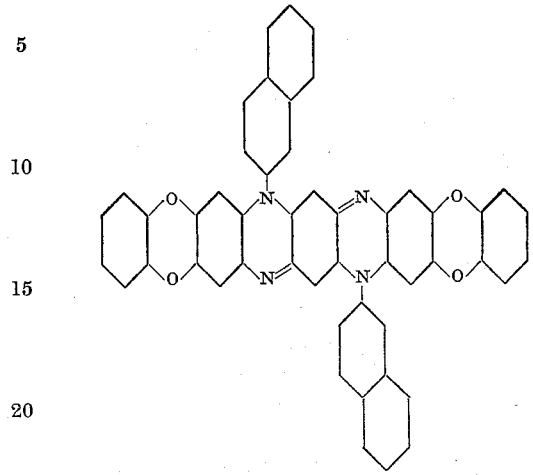

may be recrystallized from alpha-chloronaphthalene. It forms a violet crystalline powder and dissolves in sulfuric acid to a blue solution.

We claim:
1. The process which comprises oxidizing to the fluorindine compound according to known methods an azophenin compound of the general formula:

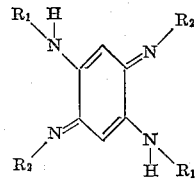

wherein R₁ represents a member selected from the group consisting of an aromatic radicle of the benzene series containing a negative substituent of the group consisting of nitro, co-alkyl, co-aryl and carboxyl, a carbocyclic aromatic radical containing more than one aromatic nucleus, and a carbocyclic aromatic radical containing a quinone nucleus and wherein R₂ represents an aromatic hydrocarbon radical of the benzene and naphthalene series.

2. The process which comprises oxidizing to the fluorindine compound according to known methods an azophenin compound of the general formula:

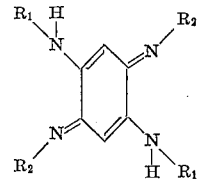

wherein R₁ represents a member selected from the group consisting of an aromatic radicle of the benzene series containing a negative substituent of the group consisting of nitro, co-alkyl, co-aryl and carboxyl, a carbocyclic aromatic radical containing more than one aromatic nucleus, and a carbocyclic aromatic radical containing a quinone nucleus and wherein R₂ represents an aromatic hydrocarbon radical of the benzene and naphthalene series, and sulfonating the product thus obtained.

3. The process which comprises oxidizing to the fluorindine compound according to known methods an azophenin compound of the formula:

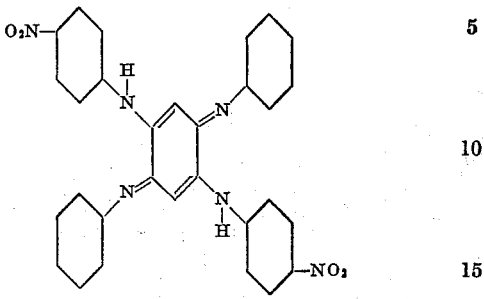

4. The process which comprises oxidizing to the fluorindine compound according to known methods an azophenin compound of the formula:

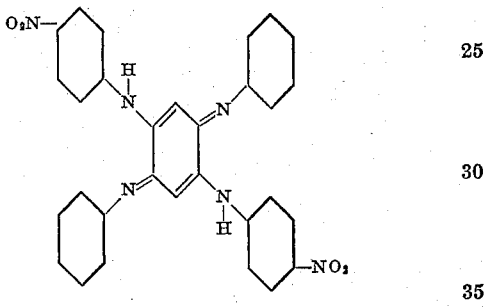

and sulfonating the product thus obtained.

5. The process which comprises oxidizing to the fluorindine compound according to known methods an azophenin compound of the formula:

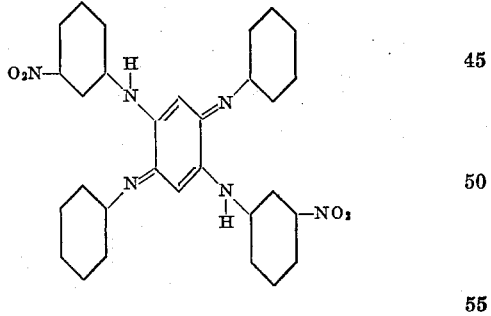

6. The process which comprises oxidizing to the fluorindine compound according to known methods an azophenin compound of the formula:

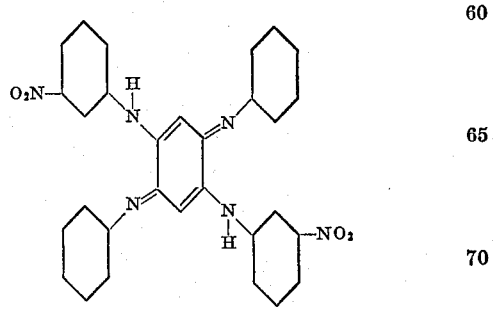

and sulfonating the product thus obtained.
7. The process which comprises oxidizing to the fluorindine compound according to known methods an azophenin compound of the formula:

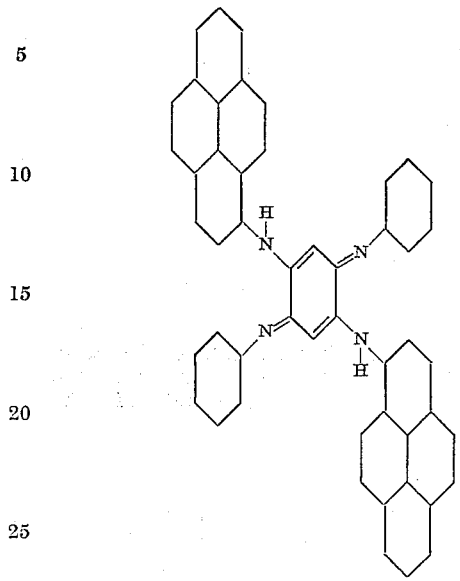

and sulfonating the product thus obtained.

8. The process which comprises oxidizing to the fluorindine compound according to known methods an azophenin compound of the formula:

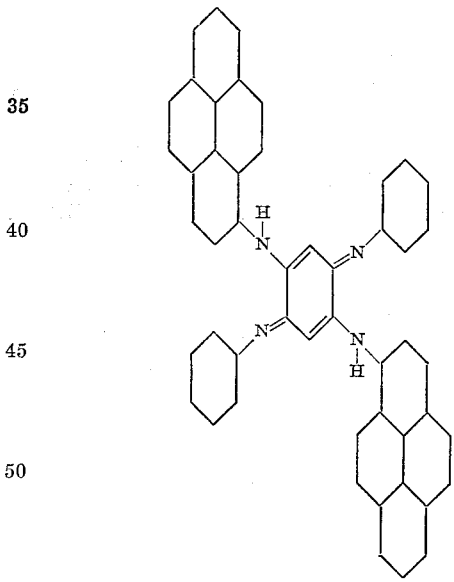

and sulfonating the product thus obtained.

9. The compounds substantially identical with those obtainable by the process which comprises oxidizing to the fluorindine compound according to known methods an azophenin compound of the general formula:

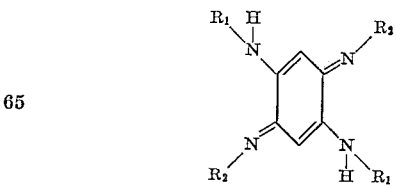

wherein $R_1$ represents a member selected from the group consisting of an aromatic radicle of the benzene series containing a negative substituent of the group consisting of nitro, co-alkyl, co-aryl and carboxyl, a carbocyclic aromatic radical containing more than one aromatic nucleus, and a carbocyclic aromatic radical containing a quinone nucleus and wherein $R_2$ represents an aromatic hydrocarbon radical of the benzene and naphthalene series and sulfonating the product thus obtained.

10. The compound substantially identical with that obtainable by the process which comprises oxidizing to the fluorindine compound according to known methods an azophenin compound of the formula:

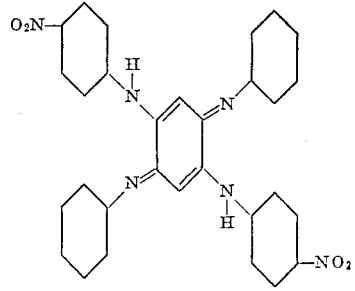

and sulfonating the product thus obtained.

11. The compound substantially identical with that obtainable by the process which comprises oxidizing to the fluorindine compound according to known methods an azophenin compound of the formula:

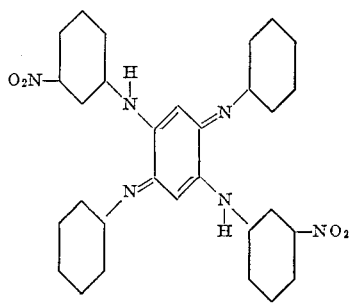

and sulfonating the product thus obtained.

12. The compound substantially identical with that obtainable by the process which comprises oxidizing to the fluorindine compound according to known methods an azophenin compound of the formula:

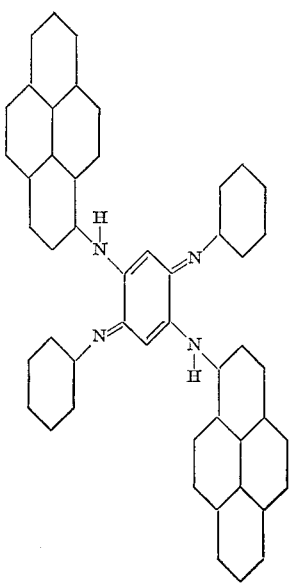

and sulfonating the product thus obtained.

ARTHUR WOLFRAM.
KURT BONSTEDT.